United States Patent [19]
Coment

[11] Patent Number: 5,899,119
[45] Date of Patent: May 4, 1999

[54] BICYCLE CRANK ASSEMBLY

[76] Inventor: Glenn H. Coment, 717 Emil Dr., Fort Pierce, Fla. 34982

[21] Appl. No.: 08/814,761

[22] Filed: Mar. 10, 1997

Related U.S. Application Data

[63] Continuation-in-part of application No. 08/500,602, Jul. 11, 1995, abandoned.

[51] Int. Cl.$^6$ ........................................... B62M 3/00
[52] U.S. Cl. ............................... 74/594.1; 74/594.3
[58] Field of Search ........................... 74/594.3, 594.1; 280/259, 212

[56] References Cited

U.S. PATENT DOCUMENTS

| | | |
|---|---|---|
| 381,547 | 4/1888 | Harrison . |
| 518,456 | 4/1894 | Ide . |
| 563,821 | 7/1896 | Unruh . |
| 595,535 | 12/1897 | Edwards . |
| 597,911 | 1/1898 | Morris ........................... 74/594.3 |
| 622,085 | 3/1899 | Shepard . |
| 631,276 | 8/1899 | Bulova . |
| 721,943 | 3/1903 | Dockstader . |
| 1,227,743 | 5/1917 | Burgedorff ..................... 74/594.3 |
| 3,888,136 | 6/1975 | Lapeyre . |
| 4,159,652 | 7/1979 | Trammell, Jr. . |
| 4,429,890 | 2/1984 | Hon . |
| 4,560,182 | 12/1985 | Yamaguchi . |
| 4,708,106 | 11/1987 | Giocastro et al. . |
| 4,793,208 | 12/1988 | Bregnard et al. . |
| 4,816,009 | 3/1989 | Philipp . |
| 4,857,035 | 8/1989 | Anderson . |
| 4,872,695 | 10/1989 | Silvano et al. . |
| 5,060,536 | 10/1991 | Boys . |
| 5,125,288 | 6/1992 | Amiet . |

FOREIGN PATENT DOCUMENTS

| | | | |
|---|---|---|---|
| 475573 | 3/1915 | France ................... | 74/594.1 |
| 739276 | 1/1933 | France ................... | 74/594.1 |
| 889597 | 1/1944 | France ................... | 74/594.3 |
| 1282081 | 12/1961 | France ................... | 74/594.1 |
| 2283042 | 3/1976 | France ................... | 280/259 |
| 2335392 | 7/1977 | France ................... | 74/594.1 |
| 2540455 | 8/1984 | France ................... | 74/594.1 |
| 2566361 | 12/1985 | France ................... | 74/594.1 |
| 413247 | 4/1946 | Italy ..................... | 74/594.1 |
| 472347 | 6/1952 | Italy ..................... | 74/594.1 |
| 477914 | 2/1953 | Italy ..................... | 74/594.1 |
| 4189694 | 7/1992 | Japan .................... | 280/259 |
| 8035 | 3/1897 | United Kingdom ........ | 74/594.3 |
| 2089298 | 6/1982 | United Kingdom ........ | 74/594.3 |

OTHER PUBLICATIONS

Brochure for Super Power Crank Rod, c. 1996, Grandprix Co., Ltd., Seoul, Korea; Sang Yeon Jo, Inventor.
Bicycle Magazine's *Training for Fitness and Endurance*, 1990, at p. 43, Rodale Press, Inc., Emmaus, Pennsylvania.
David Chauner and Michael Halstead, *The Tour de France Complete Book of Cycling*, 1990, at pp. 89–90, Villard Books, New York, New York.
Greg Lemond and Kent Gordis, *Greg Lemond's Complete Book of Bicycling*, 1987, at pp. 160–164, Putnam Publishing Group, New York, New York.
Edmund R. Burke, ed., *Science of Cycling*, 1986, at pp. 73–76, Leisure Press, Champaign Illinois.

*Primary Examiner*—Charles A. Marmor
*Assistant Examiner*—Mary Ann Battista
*Attorney, Agent, or Firm*—Quarles & Brady

[57] ABSTRACT

A bicycle having a crank assembly for driving the sprocket and chain assembly of the bicycle. The crank assembly includes a hub mounted to the frame of the bicycle so as to be rotatable at least in a direction of forward rotation. The hub is connected to a front sprocket, and two effort arm assemblies are connected to the hub. Each effort arm assembly has an effort arm. The effort arms extend outwardly substantially perpendicular to the axis of rotation of the hub, and substantially opposite to each other. Each effort arm assembly further includes an angle pedal arm. An angle pedal arm is connected to an end of the effort arm distal to the hub. Each angle pedal arm makes an angle of between about 0 and 90 degrees with the corresponding effort arm. A pedal is provided on each pedal arm, such that the pedal arm positions the pedal substantially behind the effort arm relative to the direction of forward rotation of the crank assembly. A crank assembly to modify existing bicycles is also disclosed.

4 Claims, 4 Drawing Sheets

BICYCLE CRANK ASSEMBLY

CROSS REFERENCE TO RELATED APPLICATIONS

This application is a continuation-in-part of applicant's application Ser. No. 08/500,602, filed Jul. 11, 1995, now abandoned.

FIELD OF THE INVENTION

This invention relates generally to bicycles, and more particularly to a bicycle crank assembly.

BACKGROUND OF THE INVENTION

The pedalling of a bicycle requires a rotary motion in which force generated by the legs of the rider is transmitted to a pedal, and through a crank arm, to a sprocket. The sprocket engages a chain, which is also engaged to a second sprocket that is connected to the rear wheel. Rotary motion of the continuous chain drives the second sprocket and the rear wheel to propel the bicycle forward. This basic bicycle assembly has proven to be very effective, however, there are drawbacks to this design. The force transmitted by the legs to the pedal generates torque through the action of the force on the crank arm. This torque is at a minimum when the pedals are immediately under the rider, until the pedals have reached about the two o'clock position (or the ten o'clock position if the rotation is counterclockwise), because the force of the legs is being transmitted directly through the axis of rotation of the crank arms. The position immediately under the rider is referred to as Top Dead Center (TDC), a term which is well understood in the art. It is more difficult to begin or continue to propel a bicycle when the pedals are in this TDC position. Pedalling at the position of TDC, to about the two o'clock position (or the ten o'clock position if the rotation is counterclockwise), is rendered more difficult if added force is required to propel the bicycle, as when travelling up an incline. It would therefore be desirable to provide a bicycle which will transfer the effort of the rider more effectively to propel the bicycle.

Efforts to provide an increase in torque during pedalling rotation have been attempted, and have generally employed a mechanism or method which at some point in the rotation of the crank assembly extends the length of the crank arm, thereby increasing the radius of rotation. See, for example, U.S. Pat. Nos. 518,456; 595,535; 4,560,182; 563,821; 631,276; 4,816,009; and French Patent No. FR2,283,042. Each of the mechanisms described in the above-mentioned references, achieve their desired result by increasing the length of the crank arm during the rotation cycle. This approach is different than the subject invention, which increases torque and effects a mechanical advantage on the crank arm without extending the length of the crank arm during the rotation cycle.

Another French Patent (No. FR 2,540,455) describes a pedal drive for a bicycle having cranks which are curved back on themselves by a short extension arm. The object stated for the mechanism described in the FR '455 patent is to provide an area, between the axis of the pedal sprocket and that of the foot rest pedal), a greater radius. Thus, the increased torque achieved by the crank arm of the FR '455 patent is effectively addressed by extending the length of the crank arm. Although the FR '455 patent claims a greater crank leverage, the short extension arms described and shown in the FR '455 patent are not of sufficient length to obviate the long-standing and well-recognized problem of a dead spot in the pedaling rotation, Chaumer, D. and M. Halstead (1990) THE TOUR DE FRANCE COMPLETE BOOK OF CYCLING; and LeMond, G. and K. Gordis (1987) GREG LEMOND'S COMPLETE BOOK OF CYCLING; see also, Burke, E. (1986) SCIENCE OF CYCLING (discussing the important parts of the pedaling cycles). This dead spot occurs when the pedal is in the position of TDC or within about 60 degrees of TDC (the 10 o'clock to 2 o'clock position). Accordingly, the device of the FR '455 patent does not solve the long-standing problem of eliminating this dead spot at between TDC and 60 degrees.

SUMMARY OF THE INVENTION

It is an object of the invention to provide a bicycle which will more effectively transmit the efforts of the rider to propel the bicycle.

It is another object of the invention to provide a bicycle which will provide improved riding performance, but will not require extensive modification to existing bicycle designs.

These and other objects are accomplished by a bicycle crank assembly, comprising a bent or jointed crank arm in which the arm connecting to the hub or sprocket is termed the "effort arm," and the arm extending from the effort arm to the pedal is referred to as the "pedal arm." Preferably the effort arms are joined to pedal arms at an end of each effort arm distal to the point of rotation. The pedal arms make an angle, preferably a fixed angle, of between about 0 and 90 degrees between the corresponding effort arm. A pedal or other foot-supporting structure is provided on the pedal arm substantially at the end distal to the end of the pedal arm that is connected to the effort arm. The pedal arm positions the pedal substantially behind the effort arm relative to the direction of rotation of the effort arm during the forward rotation of the effort arm. In a preferred embodiment, this configuration of the subject invention never allows the pedal to extend outward past the distal end of the effort arm relative to the point of rotation of the effort arm.

As the crank assembly rotates forward from TDC, an effort is directed by a bicycle rider to the pedal. Due to the fact that all structures have finite stiffness, the pedal arm can flex downward into the effort arm at the distal joining end. This directs the effort away from the point of rotation and applies a force to the effort arm to rotate the crank assembly. High torque is generated during the early phase of the pedaling stroke by making the pedal arm of a specific length, preferably long enough to position the effort arm at least about 30 degrees ahead of TDC when a pedal is at TDC, and more preferably between about 36 degrees and about 60 degrees. Advantageously, the pedal arm is substantially long enough to position the effort arm ahead of the pedal, whereby a mechanical advantage is achieved for the effort arm and the dead spot in the pedal rotation is decreased.

Another advantage is that a high torque can be guaranteed at an earlier pedal position. As the pedal rotates forward from TDC, the forces exerted by the rider on the pedal are transmitted via the pedal arm to the effort arm. Having achieved an advantage, the effort arm multiplies the effort creating an increase of torque between TDC and the 2 o'clock position if the rotation is clockwise or TDC and the 10 o'clock position if the rotation is counter clockwise. When the pedal has rotated so that it is approximately at the 3 o'clock (in a clockwise rotation) or 9 o'clock (in a counterclockwise rotation) positions, the length of the effort arm must be substantially long enough so that the distance from the pedal to the center point of rotation of the effort arm is approximately the same as the horizontal distance from the effort arm's distal joining end to the 6 o'clock position of the pedal in its rotation circle. This causes a torque peak approximately as high as a standard bicycle crank arm of the same distance between the pedal and the crank arm's point of rotation.

Advantageously, specific proportionate lengths in accordance with appropriate joint or bend angles of the effort arm and pedal arm allow the rider to create high torque sooner, nearly eliminating the dead spot commonly occurring in pedal rotation using crank mechanisms known in the art. The effect of the crank assembly of the subject invention is to increase the momentum of the pedaling stroke, thereby more efficiently transferring a cyclist's effort to the bicycle.

The crank assembly of the invention can be provided integrally with the bicycle. Alternatively, the crank assembly can be provided separately, and retrofitted to existing bicycles.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
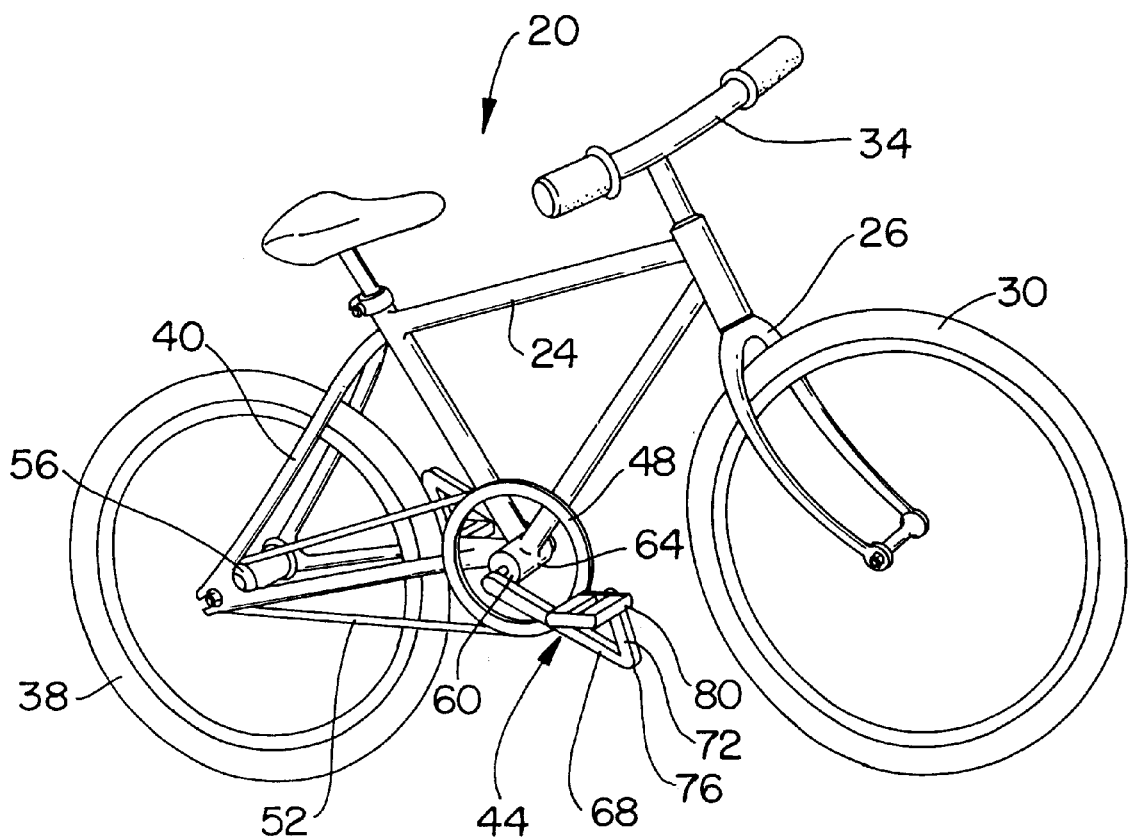
FIG. 1 is a perspective view of a bicycle according to the invention.

As shown in FIG. 1, a bicycle 20 according to the invention can be of standard design and can have a bicycle frame 24, a front fork 26, a front wheel 30, and steering handlebars 34 for steering the front fork 26 and front wheel 30. A rear wheel 38 is rotatably mounted to a rear fork 40. A crank assembly 44 is used to transmit driving power to a front sprocket 48 and a continuous chain 52. The continuous chain 52 engages a rear sprocket 56 which is connected to and drives the rear wheel 38.

The crank assembly 44 is comprised of a central hub 60 which is rotatably mounted through a housing 64 of the frame 24. An effort arm 68 extends outwardly from each end of the hub 60. The effort arms 68 are substantially perpendicular to the hub 60, and thereby to the axis of rotation of the hub 60, and are substantially opposite in orientation to each other. This is as is known in the art.

Figure 5:
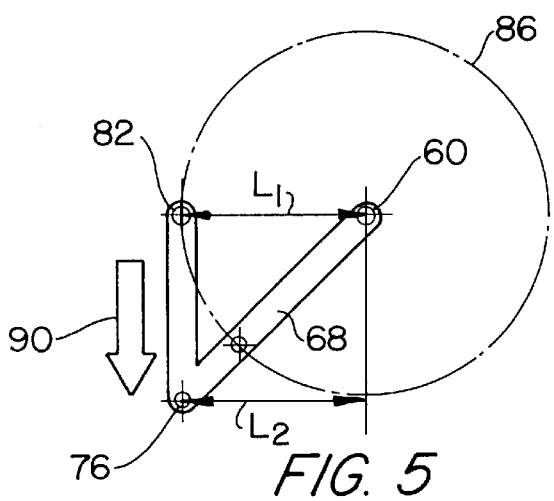

According to the invention, a pedal arm 72 is connected to an end 76 of the effort arm 68 that is distal to the point of attachment of the effort arm 68 to the hub 60. The pedal arm 72 is provided at an angle relative to the effort arm 68 of between about 0 and about 90 degrees. The pedal arm is preferably about 40 degrees to about 45 degrees, and more preferably about 41 degrees, relative to the effort arm 68. In a preferred embodiment, the effort arm 68 is of a substantial length so that the horizontal distance between the point of pedal attachment 82 and the point of rotation of the hub 60 (distance $L_1$ in FIG. 5) is approximately the same as the horizontal distance between the end 76 of the effort arm 68 and the 6 o'clock position of the pedal in its rotation circle (distance $L_2$ in FIG. 5). In one embodiment, the crank assembly can comprise an effort arm of about 10½ inches in length, joined at about a 41 degrees angle to a pedal arm of about 7 inches in length. Other lengths of the effort arm can be used so long as the invention meets the other specifications described herein.

A pedal 80 is provided substantially at the end of the pedal arm 72 that is distal to the end 76 that is attached to the effort arm 68. The pedal arm 72 positions the pedal 80 or other foot support structure substantially behind the effort arm 68 relative to direction of forward rotation of the effort arm 68 (clockwise in FIG. 1), and at a point that is preferably closer to the hub 60 than is the end 76.

Figure 2:
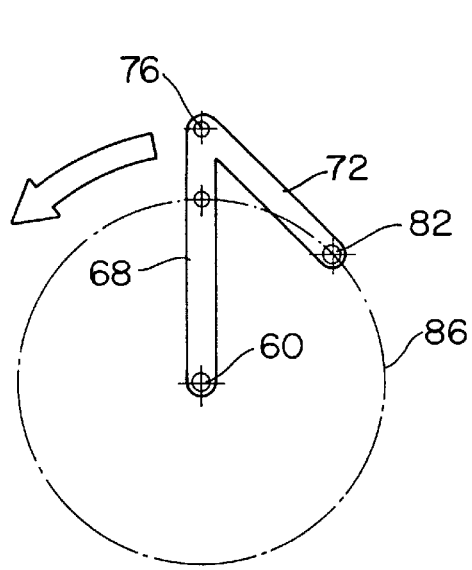
FIGS. 2–5 are schematic side elevations of a crank assembly according to the invention, in various stages of rotation.
Figure 3:
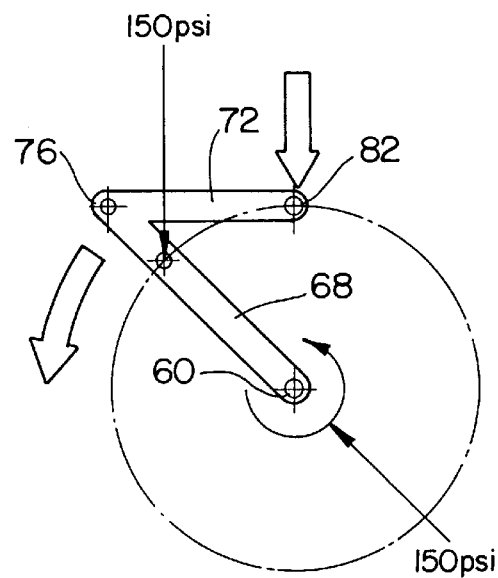
Figure 4:
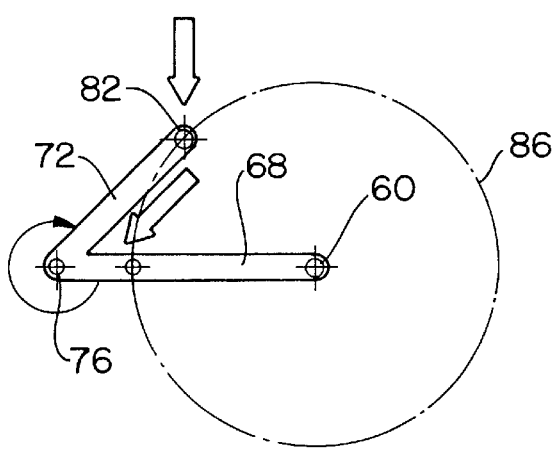

The rotation cycle of a crank assembly according to the invention is illustrated schematically in FIGS. 2–5. In FIG. 2, the effort arm 68 is substantially vertical, or at Top Dead Center (TDC). The pedal, illustrated schematically by its point of attachment 82, is moving to TDC. The pedal arm 72 positions the pedal on the pedal's true circle 86 of rotation. As the crank assembly 44 is rotated forward, as shown in FIG. 3, the pedal 82 comes to TDC, and the effort arm 68 is forward of the pedal arm 72 in rotation about the hub 60. The effort arm 68 is at a point of achieving advantage. The approximate point where effort exerted on the effort arm 68 where it is crossed by the pedal's true circle 86 of rotation will create at the hub 60 an effort of approximately equal or superior strength. The force on the pedal at TDC is behind the effort arm 68 and is angularly offset from the axis of the effort arm. No torque is transmitted at TDC but an increase in torque is generated by the invention between TDC and about the ten o'clock position (or the two o'clock position if the rotation is clockwise). As the crank assembly is rotated forward, the effort arm 68 comes to a substantially horizontal position and downward force on the pedal is transmitted through the pedal arm 72 and effort arm 68 to produce significant torque. At the position shown in FIG. 5, the pedal 82 is now substantially horizontal with the point of rotation of the hub 60. Force applied on the pedal is transmitted through the point of attachment 82 directly downward in the direction of the arrow 90 to create maximum torque. As the pedal is rotated such that the effort arm 68 is facing directly downward, the opposite effort arm 68 will come up to TDC and the process will begin again.

Figure 6:
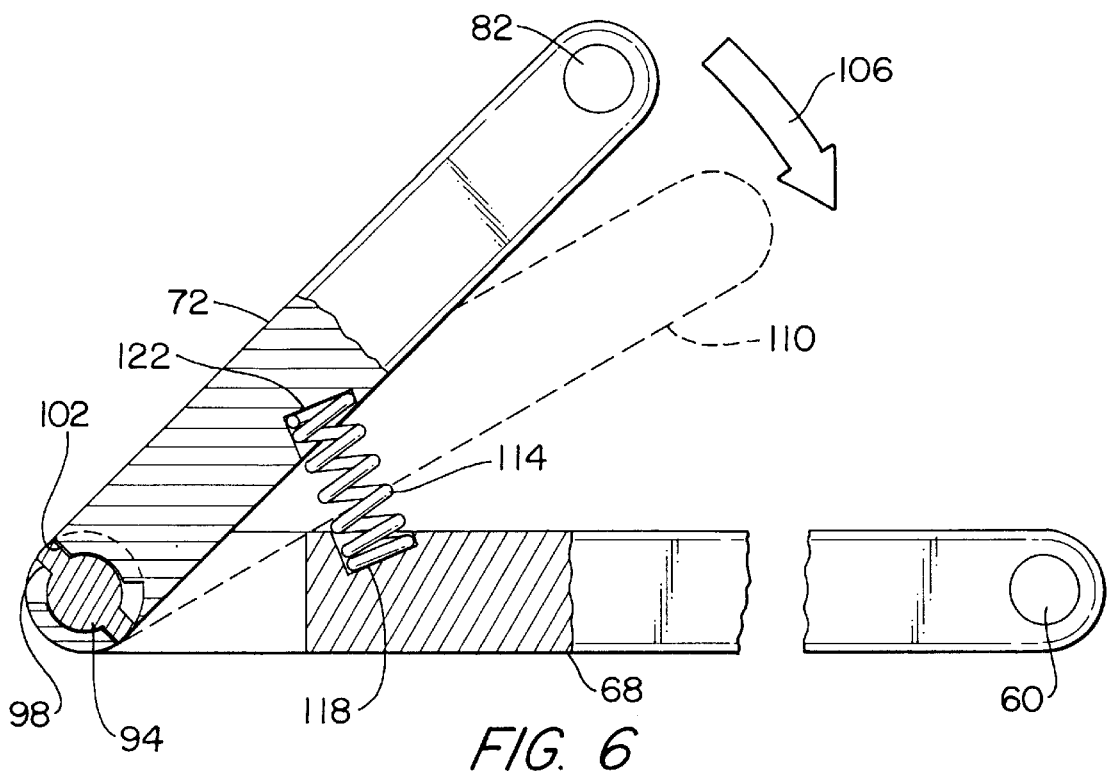
FIG. 6 is a side elevation, partially broken away and partially in phantom, depicting a biased crank assembly according to another embodiment of the invention.

An alternative embodiment is shown in FIG. 6. According to this embodiment the effort arm 68 and pedal arm 72 are pivotally mounted about a pivot connection 94. Abutting stop surfaces 98 and 102 on the effort arm 68 and pedal arm 72 limit the range of motion of the pedal arm 72 away from the effort arm 68. The pedal arm 72 pivots towards the effort arm 68 in the direction of the arrow 106, to the position 110 shown in phantom lines. A biasing means such as spring 114 or a similar elastic or pneumatic biasing structure is provided to bias the pedal arm 72 away from the effort arm 68. The spring 114 can be seated in spring seats 118 in the effort arm 68 and 122 in the pedal arm 72. The biasing action of the spring 114 will cause the pedal arm to have a variable angle relative to the effort arm 68, and this angle will depend on the amount and angle of the force that is applied to the pedal. The changing of the position of the pedal arm 72 can cause significant increases in the torque as the angle at which the force is applied changes.

It is preferable that the pedal arm 72 move relative to the effort arm 68 upon the application of a force by the rider.

This movement can be caused by flexing of the components, or by a pivotal connection between the pedal arm 72 and the effort arm 68. The movement of the pedal arm 72 relative to the effort arm 68 will cause the angle of the force applied by the rider to change, which will help to increase the torque that is generated. This angle will change with a greater applied force, since the greater force will cause additional flexing of the pedal arm 72, and a greater change in the direction of the applied force.

Figure 7:
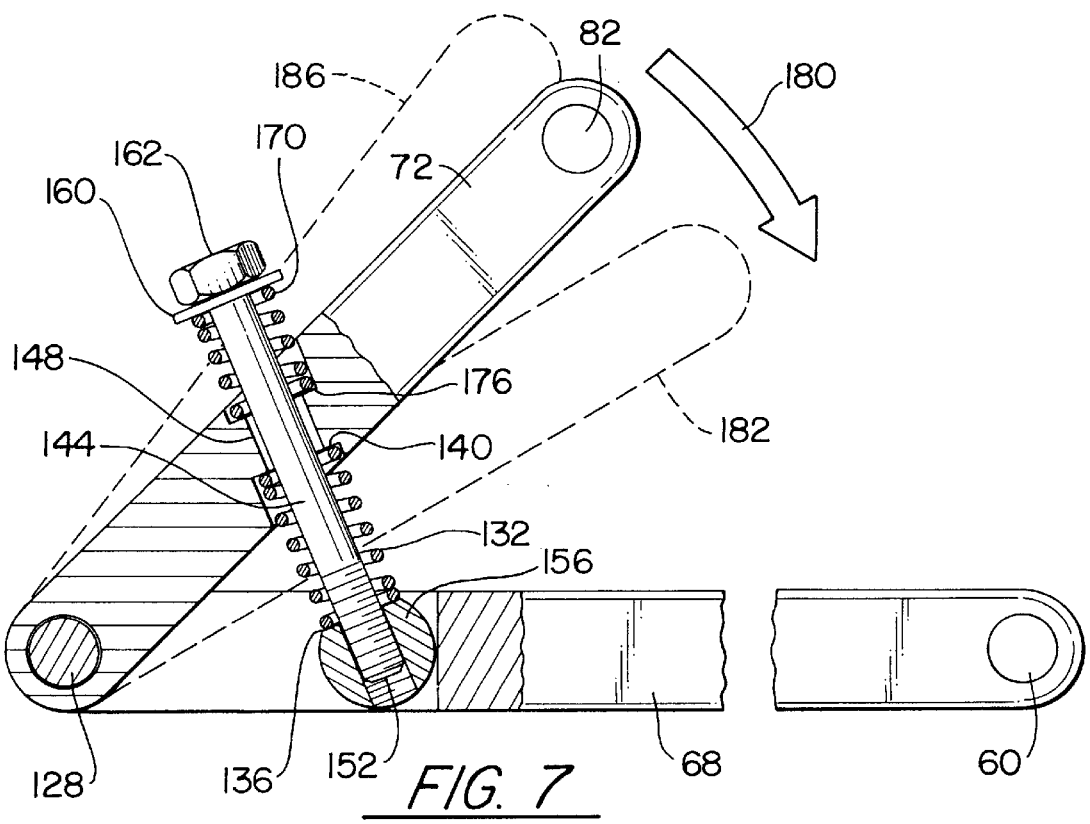
FIG. 7 is a side elevation, partially broken away and partially in phantom, of a double-biased crank assembly according to still another embodiment of the invention.

An alternative embodiment of the invention having a biased pedal arm 72 is shown in FIG. 7. In this embodiment, the pedal arm 72 is biased in both directions relative to the effort arm 68. The pedal arm 72 is pivotally mounted to the effort arm 68 about a pivot point 128. A spring 132 is provided between the effort arm 68 and the pedal arm 72. The spring 132 can be seated in a first seat 136 in the effort arm 68, and a second seat 140 in the pedal arm 72. A post 144 extends through an aperture 148 in the pedal arm 72. The post 144 can be engaged to the effort arm 68 by any suitable means, such as threads 152. A ball and socket joint 156 or other suitable structure can further be provided to permit slight rotation of the point of attachment of the post 144 to the effort arm 68. A stop 160 is provided at an end of the post 144 that is distal to the effort arm 68. A second spring 170 is positioned between the stop 160 and the pedal arm 72, and can rest in a seat 176 in the pedal arm 72. The post 144 and stop 160 can be provided as a bolt, which can be threaded into the joint 156. A washer provided adjacent to the head 162 of the bolt serves as the stop 160.

The double-biased construction will permit angular movement of the pedal arm 72 either toward or away from the effort arm 68, and in a biased manner. As the pedal arm 72 moves toward the effort arm 68 in the direction of the arrow 180 it will come to rest at a position 182, in which the spring 132 is compressed, and will act to return the pedal arm 72 to the original position. Alternatively, as a force is applied to move the pedal arm 72 outwardly with respect to the effort arm 68, the spring 170 will be compressed as the pedal arm 72 takes the position 186 shown by the phantom lines. The spring 170 will be compressed and will act to limit the outward movement of the pedal arm 72 and return the pedal arm 72 to the original position. The biasing of the pedal arm 72 will have the effect of changing the direction of the force applied by the rider.

Figure 8:
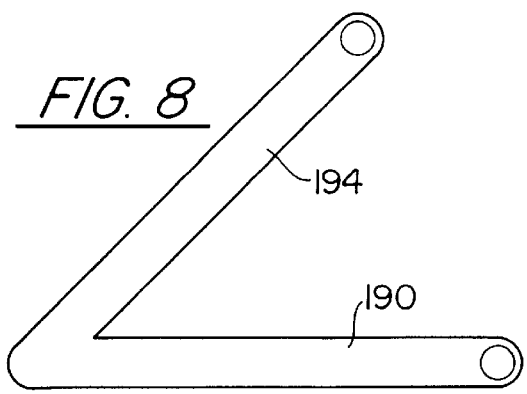
FIGS. 8–15 are side elevations of alternative crank assembly designs according to the invention.
Figure 9:
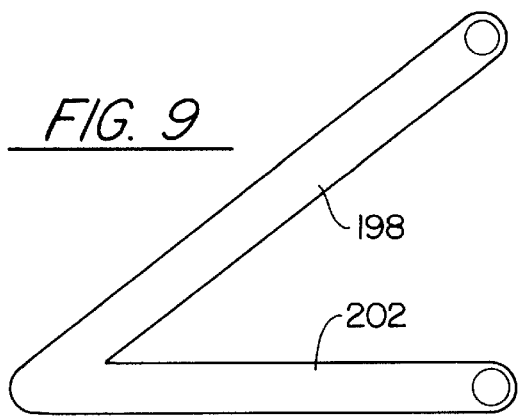
Figure 10:
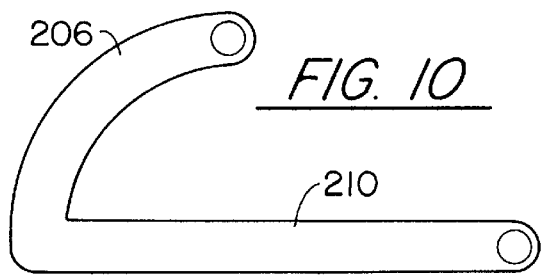
Figure 11:
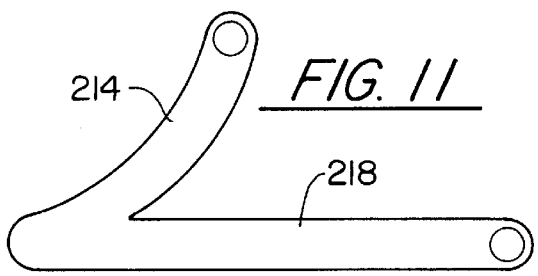
Figure 12:
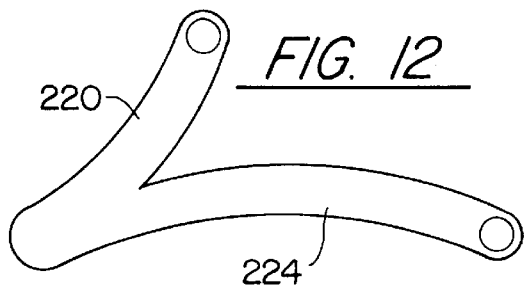
Figure 13:
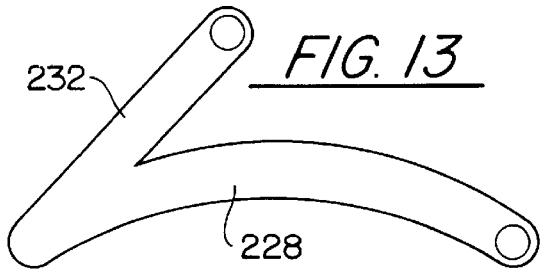
Figure 14:
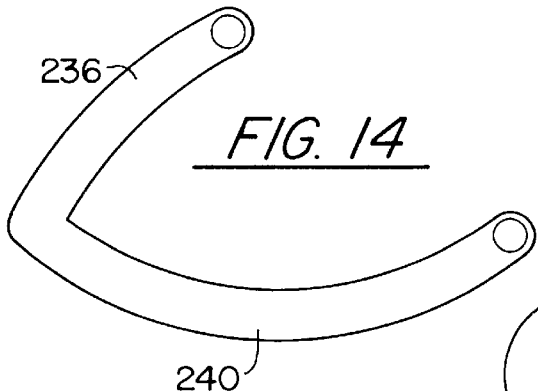
Figure 15:
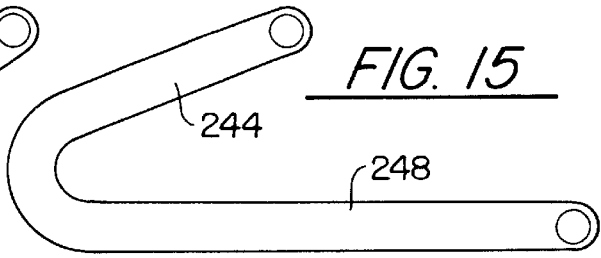

FIGS. 8–15 illustrate the many embodiments which the invention can take. In FIG. 8, the effort arm 190 and pedal arm 194 are of approximately the same length. In the embodiment of FIG. 9, the pedal arm 198 is longer than the effort arm 202. In FIG. 10, the pedal arm 206 is curved, with the concave side of the pedal arm 206 facing the effort arm 210. In FIG. 11, the pedal arm 214 is curved, and the convex side of the pedal arm 214 faces the effort arm 218. In FIG. 12, both the pedal arm 220 and the effort arm 224 are curved, and the convex side of each faces the other. In the embodiment of FIG. 13, the effort arm 228 is curved, and the convex side faces a straight pedal arm 232. In the embodiment of FIG. 14, both the pedal arm 236 and the effort arm 240 are curved, and the concave side of each faces the other. In the embodiment of FIG. 15, the pedal arm 244 and effort arm 248 are provided as a single, bent piece of material.

The invention can be provided integrally with new bicycles, and is suitable for use with most bicycle designs. A crank assembly can alternatively be provided which can be retrofitted to existing bicycles. The crank assembly of the invention can be made of any suitable materials, including those currently used to manufacture bicycle crank assemblies.

The invention can take other specific forms without departing from the spirit or essential attributes thereof. The crank assembly could be used with arm-powered devices, in which case hand grips would be substituted for pedals. Accordingly, reference should be had to the following claims, rather than to the foregoing specification, as indicating the scope of the invention.

I claim:

1. A crank assembly for driving a bicycle sprocket and chain assembly, said crank assembly comprising a hub mounted to a bicycle frame assembly so as to be rotatable at least in a direction of forward rotation, said hub being connected to a sprocket, and an effort arm assembly at each end of said hub, each effort arm assembly comprising an effort arm having a central longitudinal axis, the effort arms extending outwardly substantially perpendicular to an axis of rotation of the hub and substantially opposite to each other, each effort arm assembly further comprising a pedal arm having a central longitudinal axis, said pedal arm being connected to an end of said effort arm distal to said hub and capable of receiving a pedal on an end distal to the pedal arm end connected to the effort arm, said longitudinal axis of the pedal arm and longitudinal axis of the corresponding effort arm forming a first angle between 0°–90° relative to each other as measured using the point of connection of the pedal arm and effort arm as a vertex of said first angle, each pedal arm being of sufficient length and positioned at an appropriate angle relative to the longitudinal axis of the corresponding effort arm to position the central longitudinal axis of the corresponding effort arm at a second angle of at least 30 degrees of forward rotation ahead of an imaginary line through the center point of connection of the pedal to the pedal arm and a center point of rotation of the hub, said center point of rotation of the hub being the vertex of the second angle, said pedal arm positioning the pedal substantially behind the effort arm relative to the direction of forward rotation of said crank assembly and at a shorter distance from a center point of rotation of the hub than is the distal end of said effort arm, said pedal remaining positioned inside a rotation circle of the distal end of the effort arm.

2. The crank assembly of claim 1, wherein the second angle is about 36 degrees.

3. The crank assembly of claim 1, wherein each said pedal arm and the corresponding effort arm form an angle between about 40 degrees and 45 degrees.

4. The crank assembly of claim 1, wherein each said pedal arm and the corresponding effort arm form an angle of about 41 degrees.

* * * * *